Patented Oct. 17, 1933

1,930,845

UNITED STATES PATENT OFFICE 1,930,845

PREPARATION OF AQUEOUS DISPERSIONS

Heinrich Ulrich and Curt Schuster, Ludwigshafen-on-the-Rhine, Germany, assignors to I. G. Farbenindustrie Aktiengesellschaft, Frankfort-on-the-Main, Germany No Drawing. Application December 14, 1931, Serial No. 581,062, and in the Netherlands January 26, 1931

6 Claims. (Cl. 252—6)

The present invention relates to a process for the preparation of aqueous dispersions.

We have found that the salts of aliphatic carboxylic acids containing more than 8 carbon atoms with aliphatic or mixed hydroaromatic-aliphatic ammonia derivatives which contain one or more alkylol groups (—ROH; R=alkyl or cycloalkyl) can be employed with advantage as auxiliaries for the preparation of aqueous dispersions of water-insoluble, from liquid to solid, organic fatty substances, i. e. of fats, oils and waxes of all kind and of single components of the said fats, oils and waxes. For the sake of brevity the aforesaid aliphatic or mixed hydroaromatic-aliphatic ammonia derivatives are hereinafter referred to collectively as "aliphatic amines containing at least one alkylol group". The aliphatic carboxylic acids containing at least 8 carbon atoms which will be referred to hereafter as fatty acids comprise saturated and non-saturated carboxylic acids for example nonylic acid, caprylic acid, undecylic acid, lauric acid, palmitic acid, stearic acid, oleic acid and elaidic acid, as well as the commercial mixtures of such acids, such as are obtained for example by saponifying vegetable oils and fats, such as coco-nut fat or palm oil; oleic and stearic acids and commercial mixtures containing a substantial amount of these acids, are, however, preferred for the preparation of the salts with the said aliphatic amines containing at least one alkylol group. The aforesaid salts are very readily soluble in water and allow of obtaining very finely divided and stable aqueous dispersions of the said fatty substance. The water-insoluble fatty substances comprise for example mineral oils such as paraffin oil, mineral waxes such as ozokerite, paraffin wax and montan wax, oils, fats and waxes of vegetal, i. e. animal and vegetable, origin, such as tallow, bees wax, carnauba wax, cotton-seed oil, olive oil, palm oil, coconut oil, as well as the water-insoluble, saturated and non-saturated fatty acids and water-insoluble aliphatic alcohols which form the single constituents of the aforesaid fats, oils and waxes. The aliphatic amines containing at least one alkylol group comprise for example mono-, di- and triethanol amine, normal and iso-butylethanol amines and normal and iso-butanol amines, $\beta$-ethylhexyl-ethanolamine, cyclohexyl-mono- and diethanol amine, octadecylethanol amine and cyclohexanol-ethyl amine. The fatty acid salts of these bases readily dissolve in water and may be used either alone or in conjunction with soaps, Turkey-red oils, sulphonic acids especially alkylated aromatic sulphonic acids or their salts, or with organic solvents, such as liquid, aliphatic, hydroaromatic or aromatic hydrocarbons, for example benzine, ligroin, benzene, toluene, xylene, cyclohexane, or tetrahydronaphthalene, or liquid halogen derivatives thereof, or aliphatic alcohols, esters or ethers, such as methanol, ethanol or butanol, butyl acetate, glycol esters, dibutyl ether and like usual solvents, or with a plurality of these substances for the preparation of the aqueous dispersions.

In many cases the said salts of aliphatic amines containing at least one alkylol group may advantageously be employed in conjunction with colloidal substances, as for example glue, gelatine or gum arabic.

The dispersions may be prepared for example by stirring for example 100 parts of the fatty substance into about 100 parts of water in which from 3 to 10 parts of the fatty acid salt of the aliphatic amine, containing an alkylol group, are dissolved and adding 100 parts of water; the resulting emulsion may still be diluted with more water, according to the purpose in view. The emulsions may also be preparaed by mixing the fatty substance with the said salt and adding water to the mixture. When preparing the emulsions, the fatty acids which form the salt with the aliphatic amine may be employed in excess over the quantity necessary for neutralizing the amine, the excess of acid being thus emulsified in a free state. Any known mechanical means and apparatus may be employed for carrying out the preparation of the dispersion.

The following examples will further illustrate the nature of the present invention, which, however, is not limited thereto. The parts are by weight.

Example 1

5 parts of triethanolamine are dissolved in 300 parts of water. 100 parts of olein are gradually introduced into this solution, while vigorously stirring. A very stable and durable emulsion which may be diluted with water to any degree is obtained on account of the formation of the triethanol amine salt of oleic acid.

Example 2

100 parts of olive oil are mixed, while stirring, with 20 parts of a 50 per cent aqueous solution of the salt of butylated naphthalene sulphonic acid and octodecyl ethanolamine. 180 parts of water are then gradually added, whereby a stable emulsion is obtained.

By further addition of water this emulsion can be diluted to any desired degree.

Instead of olive oil, an equal amount of olein, stearic acid, machine oil, paraffin oil or paraffin wax may be employed, and instead of the said salt of butylated naphthalene sulphonic acid, salts of stearic, oleic, palmitic or lauric acids with other aliphatic amines of the kind defined, such as mono-, di- and tri-ethanolamine or β-hexyl-ethanolamine, may be used.

What we claim is:—

1. As new article of manufacture an aqueous dispersion comprising a fatty substance and a salt of an aliphatic amine containing at least one alkylol group with an aliphatic carboxylic acid containing more than 8 carbon atoms, selected from the class consisting of nonylic, caprylic, undecylic, lauric and elaidic acids.

2. As new article of manufacture an aqueous dispersion comprising a fatty substance and a salt of an ethanolamine with an aliphatic carboxylic acid containing more than 8 carbon atoms, selected from the class consisting of nonylic, caprylic, undecylic, lauric and elaidic acids.

3. As new article of manufacture an aqueous dispersion comprising a fatty substance and a salt of triethanol-amine with an aliphatic carboxylic acid containing more than 8 carbon atoms, selected from the class consisting of nonylic, caprylic, undecylic, lauric and elaidic acids.

4. As new article of manufacture an aqueous dispersion comprising a fatty substance and a salt of an aliphatic amine containing at least one alkylol group with a mixture of aliphatic carboxylic acids containing more than 8 carbon atoms, selected from the class consisting of nonylic, caprylic, undecylic, lauric and elaidic acids.

5. As new article of manufacture, an aqueous dispersion comprising about 100 parts of a fatty substance, from about 3 to about 10 parts of a salt of an aliphatic amine containing at least one alkylol group with an aliphatic carboxylic acid containing more than 8 carbon atoms, selected from the class consisting of nonylic, caprylic, undecylic, lauric and elaidic acids and at least 200 parts of water.

6. As an article of manufacture, an aqueous dispersion comprising a fatty oil of vegetable origin and a salt of triethanolamine with an aliphatic carboxylic acid containing more than 8 carbon atoms, selected from the class consisting of lauric and elaidic acids.

HEINRICH ULRICH.
CURT SCHUSTER.